(12) United States Patent
Baba et al.

(10) Patent No.: US 8,995,602 B2
(45) Date of Patent: Mar. 31, 2015

(54) METHOD OF CHECKING INSTALLED STATE OF JET PUMP BEAM

(75) Inventors: Atsushi Baba, Tokai (JP); Yoshinori Musha, Hitachiota (JP); Masahiro Hiratsuka, Hitachi (JP); Minoru Ootaka, Takahagi (JP); Masahiro Koike, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 266 days.

(21) Appl. No.: 13/460,984

(22) Filed: May 1, 2012

(65) Prior Publication Data

US 2012/0281800 A1    Nov. 8, 2012

(30) Foreign Application Priority Data

May 6, 2011   (JP) ................................. 2011-103473

(51) Int. Cl.
*G21C 15/25*   (2006.01)
*G21C 17/017*  (2006.01)
*G01S 7/521*   (2006.01)
*G01S 7/539*   (2006.01)
*G01S 15/88*   (2006.01)

(52) U.S. Cl.
CPC ............... *G01S 7/521* (2013.01); *G21C 15/25* (2013.01); *G21C 17/017* (2013.01); *G01S 7/539* (2013.01); *G01S 15/88* (2013.01); *Y02E 30/40* (2013.01)
USPC ........................... 376/245; 376/258; 376/372

(58) Field of Classification Search
USPC .......................................... 376/245, 258, 372
See application file for complete search history.

(56) References Cited

U.S. PATENT DOCUMENTS

| 4,394,345 | A  |   | 7/1983  | De Briere et al. |
|-----------|----|---|---------|------------------|
| 4,484,475 | A  | * | 11/1984 | Ogura et al. .................... 73/579 |
| 4,995,158 | A  | * | 2/1991  | Howell et al. .................... 29/723 |
| 2002/0114421 | A1 |   | 8/2002  | Erbes et al. |
| 2003/0142777 | A1 |   | 7/2003  | Paillaman et al. |
| 2004/0081267 | A1 | * | 4/2004  | Paillaman et al. ............ 376/245 |
| 2010/0002826 | A1 |   | 1/2010  | Mori et al. |
| 2012/0216382 | A1 | * | 8/2012  | Hiratsuka et al. .......... 29/407.05 |

FOREIGN PATENT DOCUMENTS

| JP | 57-53657  | A  | 3/1982  |
|----|-----------|----|---------|
| JP | 63-168594 | A  | 7/1988  |
| JP | 2-88127   | A  | 3/1990  |
| JP | 2-304325  | A  | 12/1990 |
| JP | 3-32020   | B2 | 5/1991  |
| JP | 3-214033  | A  | 9/1991  |

(Continued)

*Primary Examiner* — Jack W Keith
*Assistant Examiner* — Daniel Wasil
(74) *Attorney, Agent, or Firm* — Crowell & Moring LLP

(57) ABSTRACT

A jet pump beam (hereinafter, referred to as a beam) is fitted into a pair of projecting portions installed to a transition piece, and after the beam is arched, a beam bolt engaged with the beam is tightened. An end of the beam bolt comes in contact with a top surface of an insert member fitted into an elbow disposed between the pair of projecting portions. An ultrasonic sensor head is fixed to the beam bolt, and ultrasonic waves are sent to the beam bolt from the ultrasonic sensor in the ultrasonic sensor head. An ultrasonic measuring apparatus obtains echo intensity of each of reflected waves generated at the end of the beam bolt and a bottom surface of the insert member, and based on the echo intensities, an echo intensity ratio R is calculated. The installed state of the beam is checked using the echo intensity ratio R.

7 Claims, 12 Drawing Sheets

(56) References Cited

FOREIGN PATENT DOCUMENTS

| | | |
|---|---|---|
| JP | 2002-500752 A | 1/2002 |
| JP | 2003-255075 A | 9/2003 |
| JP | 2004-151097 A | 5/2004 |
| JP | 4052377 B2 | 12/2007 |
| JP | 2010-14674 A | 1/2010 |
| WO | WO 97/44644 A2 | 11/1997 |

\* cited by examiner

METHOD OF CHECKING INSTALLED STATE OF JET PUMP BEAM

CLAIM OF PRIORITY

The present application claims priority from Japanese Patent application serial no. 2011-103473, filed on May 6, 2011, the content of which is hereby incorporated by reference into this application.

BACKGROUND OF THE INVENTION

1. Technical Field

The present invention relates to a method of checking an installed state of a jet pump beam and, in particular, to a method of checking an installed state of a jet pump beam suitable for applying to a jet pump provided in a reactor pressure vessel in a boiling water reactor.

2. Background Art

A boiling water reactor is provided with a plurality of jet pumps disposed in a downcomer which is an annular region formed between a reactor pressure vessel (hereinafter, referred to as a RPV) to which a recirculation pipe is connected and a cylindrical core shroud surrounding a core in the RPV. The jet pump includes an elbow, a nozzle, a bell mouth, a throat, and a diffuser. Cooling water pressurized by drive of a recirculation pump installed to the recirculation pipe flows through the recirculation pipe, and as driving water, passes through a riser pipe, a transition piece, and the elbow, and is ejected from the nozzle into the bell mouth and the throat. The nozzle increases the speed of the driving water. The cooling water around the nozzle in the downcomer is sucked into the throat as suction water by action of the ejected driving water, and flows into the diffuser while exchanging kinetic momentum with the driving water. The cooling water discharged from the diffuser is supplied to the core through a lower plenum in the RPV.

The elbow, the nozzle, the bell mouth, and the throat included in the jet pump installed in the reactor pressure vessel are joined together as a single-piece construction and constitute a removable inlet mixer. At the time of inspection and repair, the inlet mixer is removed from a transition piece and the diffuser.

The driving water flowed upward in the riser pipe changes its flowing direction 180° in the elbow and flows into the nozzle of the jet pump as a downward flow. Consequently, since upward force exerted by a flowing fluid is applied to the elbow, a top surface of the elbow is held down by a jet pump beam. Either end of the jet pump beam is inserted into a groove formed in each of a pair of projecting portions extending upward from the transition piece connected to the top of the riser pipe, and the jet pump beam is kept in a deflection state, that is, an arched state.

Japanese Patent Laid-open No. 63(1988)-168594 states a jet pump for a boiling water reactor. This jet pump is provided with a riser pipe, an inlet mixer, and a diffuser. The inlet mixer has an elbow communicated with the riser pipe, a nozzle connected to the elbow, a bell mouth disposed below the nozzle, and a throat provided to a lower end of the bell mouth. A transition piece having a pair of projecting portions is connected to the riser pipe, and the elbow is disposed between the projecting portions. A jet pump beam is inserted to each groove formed in the pair of projecting portions. A tensioner disposed between the jet pump beam and the top portion of the elbow adds a deflection amount δ to the jet pump beam. In this way, the elbow is installed to the transition piece, and the elbow is pushed against the transition piece by the jet pump beam having the deflection amount δ.

Japanese Patent No. 4052377 states a method of installing a jet pump beam using a jet pump beam fixing apparatus. This jet pump beam fixing apparatus has a fixing device attached to a jet pump beam. The fixing device engages with ratchet teeth formed around a beam bolt which engages with a jet pump beam to fix the jet pump beam. In the conventional method of installing the jet pump beam stated in Japanese Patent No. 4052377, the jet pump beam, each groove formed in a pair of projection portions installed on a transition piece, and a top surface of an insert member fitted into a recess formed in a top portion of an elbow where a lower end portion of the beam bolt installed to the jet pump beam comes in contact with, are checked for the presence of a foreign object, and when the foreign object is found, it is removed. Then, the jet pump beam is inserted into each groove formed in a pair of projecting portions facing each other of the transition piece, the center portion of the jet pump beam is pulled up with a tensioner to add a predetermined bent amount to the jet pump beam, and the beam bolt is tightened by the above fixing device.

Japanese Patent Laid-open No. 2010-14674 states a method of installing a jet pump beam using a bolt fixing apparatus for a jet pump beam. This bolt fixing apparatus has a lock cap slidable in the axial direction, provided to the beam bolt, and a body housing for accommodating the lock cap, installed on the upper surface of the jet pump beam. In the bolt fixing apparatus, tapered external teeth are formed on an outer circumferential surface of the lock cap and internal toothed grooves that engage with the tapered external teeth are formed in the body housing. In Japanese Patent Laid-open No. 2010-14674, the jet pump beam is installed as follows: The jet pump beam is inserted into each groove formed in a pair of projecting portions facing each other of a transition piece, and the beam bolt rotatably installed to the jet pump beam pushes an elbow of an inlet mixer against a transition piece. The external teeth and the internal toothed grooves of the bolt fixing apparatus are engaged with each other to stop the rotation of the beam bolt.

The conventional installation of a jet pump beam did not allow direct checking of the installation condition of the jet pump beam to the transition piece (pushing force to the elbow by the jet pump beam, and presence of a foreign object between the insert member and a lower end of the beam bolt) during the jet pump beam installation. If the pushing force to the elbow by the jet pump beam is not enough or if a foreign object is caught between the insert member and the end of the beam bolt, it may cause vibration of the inlet mixer due to insufficient pushing force to the elbow for resisting upward force exerted by a flowing fluid, and the jet pump may not function as assumed.

Additionally, methods for checking bolt installation are stated, for example, in Japanese Patent Laid-open No. 2(1990)-88127, Japanese Patent Laid-open No. 2(1990)-304325, and Japanese Patent Laid-open No. 3(1991)-214033.

Japanese Patent Laid-open No. 2(1990)-88127 states a screw seating confirming apparatus. This screw seating confirming apparatus has an ultrasonic sensor installed inside a holder, an ultrasonic pulse generator for sending ultrasonic waves to the ultrasonic sensor, a receiver for receiving echo signals from the ultrasonic sensor, and a gate circuit for inputting each output signal from the receiver and the ultrasonic pulse generator to detect a level of voltage of echo from a seating surface of the object for installing a screw tightening unit where a head portion of the screw tightening unit comes in contact with. In the screw seating confirming process stated in Japanese Patent Laid-open No. 2(1990)-88127, it is focused attention on the following aspects: when the screw tightening unit is seated to the target object, compared to when it is not seated, a reflection rate of the ultrasonic waves at the seating surface of the object is decreased and a level of echo voltage of the same is reduced.

Japanese Patent Laid-open No. 2(1990)-304325 states a method for confirming bolt clamping operation using ultrasonic wave. In this method for confirming bolt clamping operation, a clamped state of a bolt is confirmed by setting a gate for each location of reflection echoes and taking the absolute value of a difference between a pre-stored reference value of a reference bolt and a measured value of a measuring bolt, or by taking a ratio of the pre-stored reference value to the measured value.

Further, Japanese Patent Laid-open No. 3(1991)-214033 states a technology for measuring an axial tension and bending of a bolt based on propagation time and the echo height of ultrasonic waves before and after bolt tightening.

CITATION LIST

Patent Literature

[Patent Literature 1] Japanese Patent Laid-open No. 63(1988)-168594
[Patent Literature 2] Japanese Patent No. 4052377
[Patent Literature 3] Japanese Patent Laid-open No. 2010-14674
[Patent Literature 4] Japanese Patent Laid-open No. 2(1990)-88127
[Patent Literature 5] Japanese Patent Laid-open No. 2(1990)-304325
[Patent Literature 6] Japanese Patent Laid-open No. 3(1991)-214033

SUMMARY OF THE INVENTION

Technical Problem

In a jet pump provided in a boiling water reactor, a radius of curvature of a curved surface formed at an end portion of a beam bolt rotatably installed to a jet pump beam is smaller than a radius of curvature of a downward convex surface where the end portion comes in contact with, formed in the top surface of an insert member fitted into the recess formed in the top portion of an elbow.

The inventors have thought about using ultrasonic waves to check the pushing force onto the top surface of the insert member by the end surface of the beam bolt having the above shapes. Thus, the inventors have studied the application of the technologies stated in each of Japanese Patent Laid-open No. 2(1990)-88127, Japanese Patent Laid-open No. 2(1990)-304325, and Japanese Patent Laid-open No. 3(1991)-214033 for checking the tightened state of a bolt using ultrasonic waves.

In the method for confirming the clamped state of a bolt, stated in Japanese Patent Laid-open No. 2(1990)-304325, a clamped state is evaluated by comparing a value measured at a bolt that is a measurement object with a pre-stored reference value measured using a reference bolt. However, the condition of acoustic joint for the ultrasonic sensor is changed depending on the surface condition of the object for installing an ultrasonic sensor for confirming the clamped state, so that the measurements may vary widely, reducing the accuracy of evaluation. In particular, in a jet pump provided to a boiling water reactor, a beam bolt having a curved end surface is used to push the downward convex surface formed on the top surface of the insert member, having a different radius of curvature from the curved surface of the beam bolt, so that a difference in the contact condition between the lower end of the beam bolt and the top surface of the insert member makes a difference in the acoustic joint for the ultrasonic sensor. Thus, the pushing force based on the beam bolt cannot be accurately checked.

In the method for confirming the state of a bolt (a screw tightening unit) being tightened to an object, stated in Japanese Patent Laid-open No. 2(1990)-88127, as described above, the seating state of a bolt head to the object is checked using ultrasonic waves. However, even when this checking method is applied to check for the presence of a foreign object between the end surface of the beam bolt and the top surface of the insert member, since a difference in the contact condition between the end of the beam bolt and the top surface of the insert member makes a difference in the acoustic joint for the ultrasonic sensor, the pushing force onto the top surface of the insert member by the end surface of the beam bolt provided to the jet pump beam cannot be accurately checked. The same problem arises when the technology for measuring the axial tension and bending of a bolt, stated in Japanese Patent Laid-open No. 3(1991)-214033, is applied to check the pushing force onto the top surface of the insert member by the end surface of the beam bolt provided to the jet pump beam.

In the same manner, when the measurement using ultrasonic waves is performed before and after bolt tightening, a change in the surface condition of the bolt for installing the ultrasonic sensor and a change in the entering direction of the ultrasonic waves from the ultrasonic sensor to the bolt make a change in the acoustic joint for the ultrasonic sensor. Because of this, the measurements by the ultrasonic waves vary widely, which reduces the accuracy of evaluating the tightened state of the bolt. The pushing force cannot be checked accurately when these technologies are applied to check the pushing force onto the top surface of the insert member by the end surface of the beam bolt provided to the jet pump beam.

It is an object of the present invention to provide a method of checking an installed state of a jet pump beam that can check still more accurately a installed jet pump beam.

Solution to Problem

The feature of the present invention for accomplishing the above object is a method of checking an installed state of a jet pump beam comprising steps of:

separately inserting either end portion of an jet pump beam disposed above an inlet mixer into a groove formed in each of a pair of projecting portions in a state that the inlet mixer is disposed between a pair of projecting portions of a transition piece provided to a riser pipe, one end portion of the inlet mixer is inserted to a diffuser provided in a reactor pressure vessel and another end portion of the inlet mixer is communicated with the riser pipe disposed in the reactor pressure vessel;

arching the jet pump beam by moving a center portion of the jet pump beam upward;

pushing against a second curved surface formed in a top surface of an insert member fitting into a top end portion of the inlet mixer, where the second curved surface has a second radius of curvature larger than a first radius of curvature of a first curved surface formed in a lower end portion of a screw member engaged with the arched jet pump beam, by tightening the screw member;

sending ultrasonic waves to the screw member from an ultrasonic sensor while the first curved surface of the screw member is pushed against the second curved surface of the insert member;

obtaining first echo intensity of first reflected waves generated at the first curved surface and second echo intensity of second reflected waves generated at a surface of the insert member opposite from the second curved surface; and checking installation of the jet pump beam by using the first echo intensity and the second echo intensity.

According to the present invention, whether the contact between the first curved surface of the beam bolt and the second curved surface of the insert member is correct or not can be accurately checked because in the state that the first curved surface of the screw member is pushed against the second curved surface of the insert member fitted into the top end portion of the inlet mixer, the first echo intensity of the first reflected waves generated at the first curved surface by the ultrasonic waves sent to the screw member from the ultrasonic sensor and the second echo intensity of the second reflected waves generated by the ultrasonic waves at the surface of the insert member opposite from the second curved surface are each obtained, and the installation (the pushing force by the screw member) of the jet pump beam is checked based on the first and the second echo intensities. In this way, the present invention can check accurately the installation of the jet pump beam (the pushing force by the screw member).

It is desirable that the check of the installation of the jet pump beam is performed based on an echo intensity ratio obtained by using the first and the second echo intensities.

Advantageous Effect of the Invention

According to the present invention, the installed jet pump beam can be accurately checked.

DETAILED DESCRIPTION OF THE PREFERRED EMBODIMENTS

Embodiments of the present invention will be described below.

Embodiment 1

A method for checking an installed state of a jet pump beam according to embodiment 1, which is a preferred embodiment of the present invention, will be described with reference to FIGS. 1, 2, 7, 8, and 9.

Figure 3:
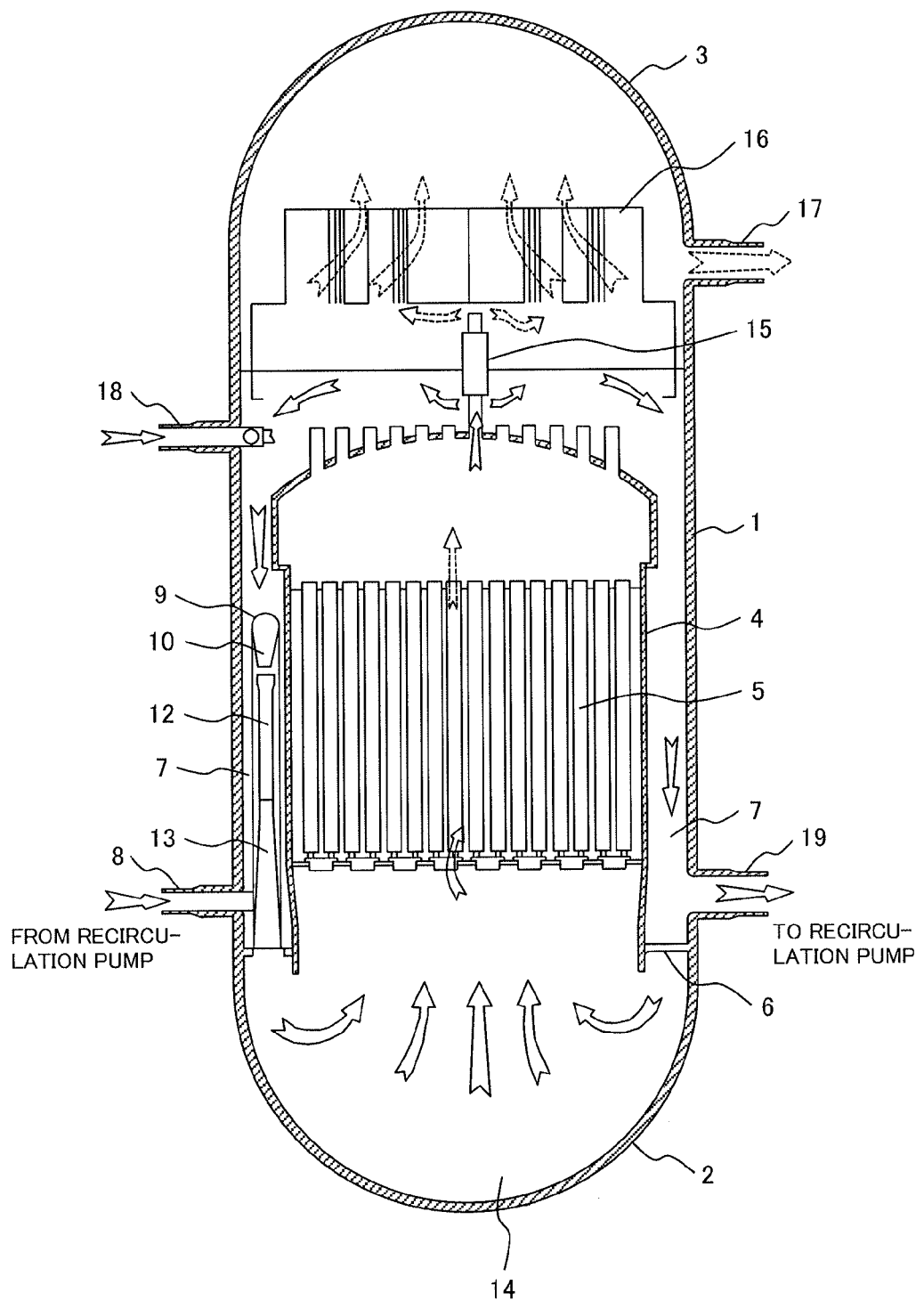
FIG. 3 is a longitudinal sectional view showing a boiling water reactor to which a method for checking an installed state of a jet pump beam shown in FIG. 1 is applied.
Figure 4:
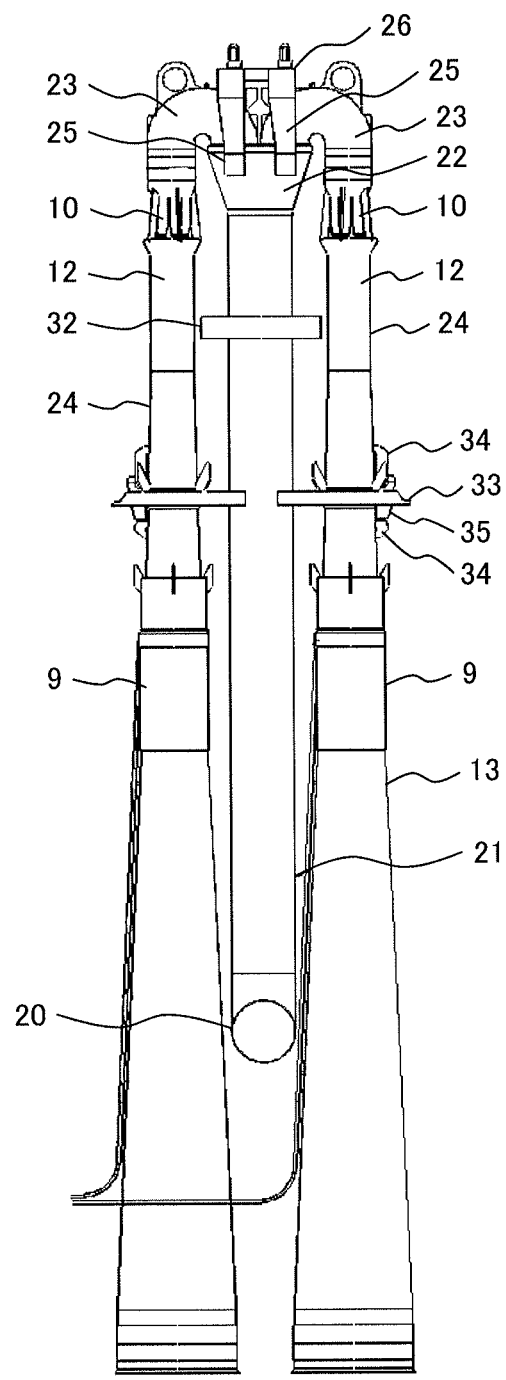
FIG. 4 is an enlarged view showing a vicinity of the jet pump shown in FIG. 3.

Before explaining a method for checking an installed state of a jet pump beam in the present embodiment, the overall structure of a boiling water reactor to which the jet pump is applied will be described below with reference to FIGS. 3 and 4. A boiling water reactor (BWR) has a reactor pressure vessel 1 and is provided with a core shroud 4 in the reactor pressure vessel 1. The core shroud 4 is supported by a shroud support structure 6 installed to the inner surface of the reactor pressure vessel 1. The reactor pressure vessel is hereinafter referred to as the RPV. The RPV 1 has a bottom head 2, which is a bottom plate of the reactor pressure vessel 1, at the bottom and a removable top head (top cover) 3 at a top. A core 5 loaded with a plurality of fuel assemblies is disposed in the core shroud 4. A steam separator 15 and a steam dryer 16 are disposed above the core 5 in the RPV 1.

A plurality of jet pumps 9 is disposed in an annular downcomer 7 formed between the RPV 1 and the core shroud 4, and is installed to the shroud support structure 6. A recirculation system provided to the RPV 1 has a recirculation pipe 19 and a recirculation pump (not shown) installed to the recirculation pipe 19. One end of the recirculation pipe 19 is connected to a nozzle of the RPV 1 and communicated with the downcomer 7. The other end of the recirculation pipe 19 is connected to an entry nozzle 8 of the RPV 1 and communicated with a riser elbow 20 (see FIG. 4). The riser elbow 20 is connected to the lower end of a riser pipe 21 disposed in the downcomer 7 and the upper end of the riser pipe 21 is connected to a transition piece 22. The transition piece 22 is practically a part of the riser pipe 21.

The jet pump 9 has a diffuser 13 and an inlet mixer 24. The inlet mixer 24 has an elbow 23, a nozzle 10, a bell mouth, and a throat 12 which are joined together as single-piece construction. The transition piece 22 is connected to the elbow 23 of the jet pump 9. Another end of the elbow 23 is connected to the nozzle 10 and a flow passage is curved 180° in the elbow 23. The nozzle 10 is installed to the bell mouth by a plurality of support plates, and the throat 12 is connected to a lower end of the bell mouth. The lower end of the diffuser 13 is joined with the shroud support structure 6. The throat 12 and the diffuser 13 are connected with a slip joint, at which a lower end portion of the throat 12 is inserted into an upper end portion of the diffuser 13.

A horizontal riser brace 32 installed to the inner surface of the RPV 1 supports the riser pipe 21. A horizontal bracket 33 installed to the riser pipe 21 holds each throat 12 of two jet pumps 9 located in either side of the riser pipe 21. A support member 34 installed to the bracket 33 fixes the throat 12 in a vertical direction.

Figure 5:
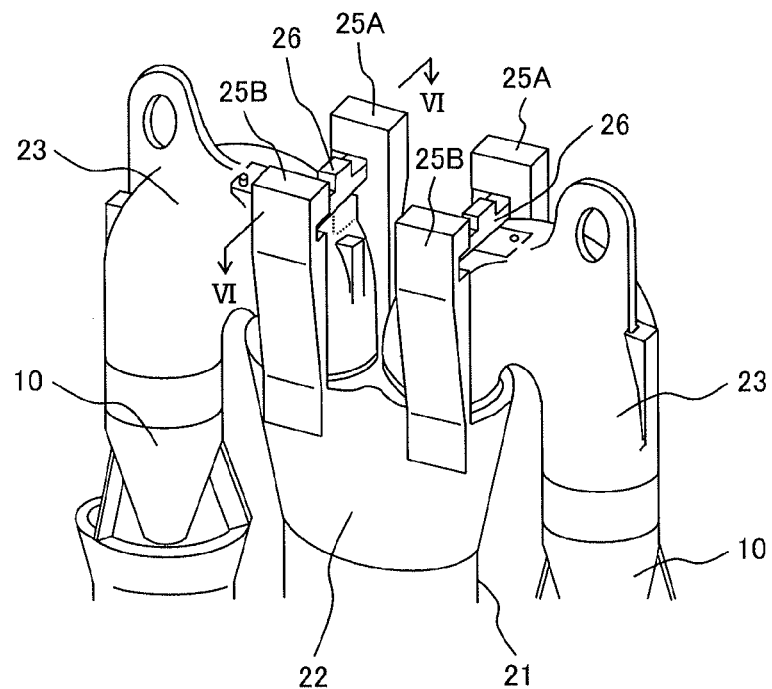
FIG. 5 is a perspective view showing a vicinity of elbows installed with jet pump beams.
Figure 6:
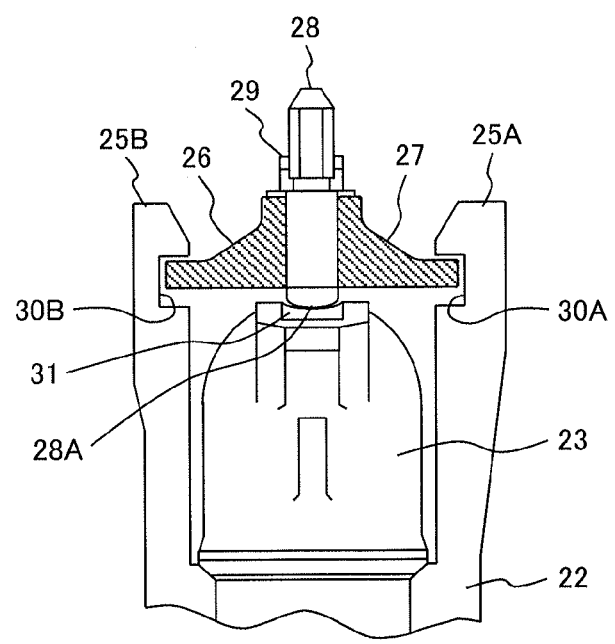
FIG. 6 is a cross-sectional view taken along VI-VI line of FIG. 5.

The transition piece 22 has a pair of projecting portions 25A and 25B extending upward, and one elbow 23 communicated with the transition piece 22 is disposed between the projecting portions 25A and 25B (see FIGS. 5 and 6). This elbow 23 is the elbow 23 of one of two jet pumps 9 communicated with one riser pipe 21. The other elbow 23 communicated with the transition piece 22 is disposed between the other pair of projecting portions 25A and 25B of the transition piece 22 (see FIG. 5). This elbow 23 is the elbow 23 of the remaining jet pump 9 of the two jet pumps 9 described above. The transition piece 22 has a driving water passage communicating each of the two elbows 23 and the riser pipe 21 is formed inside. A groove 30A extending in the horizontal direction is formed in each of the two projecting portions 25A, and a groove 30B extending in the horizontal direction and facing the groove 30A is formed in each of the two projecting portions 25B (see FIG. 6). A jet pump beam 27 of a beam assembly 26 is inserted into the grooves 30A and 30B formed in the pair of opposing projecting portions 25A and 25B. The jet pump beam 27 of the other beam assembly 26 is inserted into the grooves 30A and 30B formed in the other pair of opposing projecting portions 25A and 25B.

Beam tensioning (arching) is performed to the jet pump beam 27, both ends of which is inserted in the grooves 30A and 30B to add a predetermined deflection amount to the jet pump beam 27. Then, by tightening a beam bolt 28 rotatably provided to the jet pump beam 27, the inlet mixer 24 is pushed to the transition piece 22, that is, the riser pipe 21. A recess 36 is formed in the top portion of the elbow 23 (see FIG. 1), and an insert member 31 is fitted into the recess 36 (see FIGS. 1 and 6). A downward convex curved surface 71 (see FIG. 10) as a concave portion is formed on a top surface of the insert member 31. A downward convex curved surface 70 (see FIG. 10) formed at an end of the tightened beam bolt 28 is in contact with the downward convex curved surface 71 formed in the top surface of the insert member 31. A radius of curvature of the second curved surface is larger than a radius of curvature of the first curved surface.

When maintenance and inspection are performed, the jet pump beam 27 is removed from the projecting portions 25A and 25B by loosening the beam bolt 28, and the support member 34 is removed from the bracket 33. Therefore, the inlet mixer 24 can be detached from the diffuser 13 and the riser pipe 21, that is, the transition piece 22.

The beam assembly 26 will be described with reference to FIG. 6. The beam assembly 26 has a jet pump beam 27 and the beam bolt 28. The jet pump beam 27 has a length of the distance between a vertical surface of the groove 30A formed in the projecting portion 25A and a vertical surface of the groove 30B formed in the projecting portion 25B in the opposing projecting portions 25A and 25B. The beam bolt 28 is installed in a center portion of the jet pump beam 27 in a longitudinal direction of the jet pump beam 27. The beam bolt 28 extends in the vertical direction and engages with a screw hole formed through the jet pump beam 27 in the vertical direction. A keeper 29 is provided to the top surface of the jet pump beam 27. Both end portions of the jet pump beam 27 are respectively inserted into the groove 30A of the projecting portion 25A and the groove 30B of the projecting portion 25B facing each other.

Cooling water (a suction flow or coolant) that is suction water existing in an upper portion of the inside of RPV 1 is mixed with feed water supplied into the RPV 1 from a feed water pipe 18 and flows down in the downcomer 7. The cooling water in the downcomer 7 is sucked into the recirculation pipe 19 by the drive of the recirculation pump and pressurized by the recirculation pump. This pressurized cooling water is referred to as driving water (a driving fluid) for convenience. This driving water flows through the recirculation pipe 19, the riser elbow 20, the riser pipe 21, the transition piece 22, and the elbow 23, reaches the nozzle 10 and is ejected from the nozzle 10 into the bell mouth and the throat 12. The cooling water that is suction water existing around the nozzle 10 in the downcomer 7 is sucked into the throat 12 through the bell mouth by the ejection of the driving water from the nozzle 10, passing through a cooling water passage formed between the nozzle 10 and the bell mouth. This cooling water flows down in the throat 12 along with the driving water and discharged from the lower end of the diffuser 13. The cooling water discharged from the diffuser 13 is supplied to the core 5 through a lower plenum 14.

The cooling water is heated when passing the core 5 and becomes a gas-liquid two-phase flow including water and steam. The steam separator 15 separates the gas-liquid two-phase flow into steam and water. The separated steam is introduced into a main steam pipe 17 after the removal of moisture in the steam dryer 16. This steam is introduced to a steam turbine (not shown) through the main steam pipe 17 to rotate the steam turbine. A generator connected to the steam turbine is rotated to generate power. The steam discharged from the steam turbine is condensed into water in a condenser (not shown). This condensed water is supplied into the RPV 1 as feed water through the feed water pipe 18. The water separated in the steam separator 15 and the steam dryer 16 falls down to reach the downcomer 7 as cooling water.

The jet pump 9 having the elbow 23, the nozzle 10, the bell mouth, the throat 12, and the diffuser 13 as the main components, sucks the cooling water around the nozzle 10, so that a more amount of cooling water can be sent into the core 5 with a less flow of driving water.

The jet pump beam 27 with a predetermined deflection amount adds pushing force to the elbow 23 through the beam bolt 28, pushing the elbow 23, i.e., the inlet mixer 24 toward the riser pipe 21. To be more specific, the jet pump beam 27 and the beam bolt 28 add the pushing force to the elbow 23 in such a way that upward force exerted by a flowing fluid is applied to the elbow 23 when the driving water flows through the elbow 23.

For example, when vibration of the inlet mixer 24 is increased, the jet pump beam 27 used until then may be exchanged to a new jet pump beam 27 during a periodic inspection of the boiling water reactor. Using a method of checking an installed state of a jet pump beam performed at this time as an example, the method for checking an installed state of a jet pump beam according to the present embodiment will be described. The beam bolt 28 is loosened and the jet pump beam 27 is withdrawn from the grooves 30A and 30B of the pair of projecting portions 25A and 25B. Then, when a new jet pump beam 27 is installed to the pair of projecting portions 25A and 25B, the method of checking an installed state of a jet pump beam according to the present embodiment is performed. This method of checking an installed state of a jet pump beam will be explained with reference to FIGS. 1, 2, 7, 8, and 9. The present embodiment may be applied when the jet pump beam 27 is installed to the pair of projecting portions 25A and 25B of the transition piece 22 in a newly built boiling water reactor.

Figure 1:
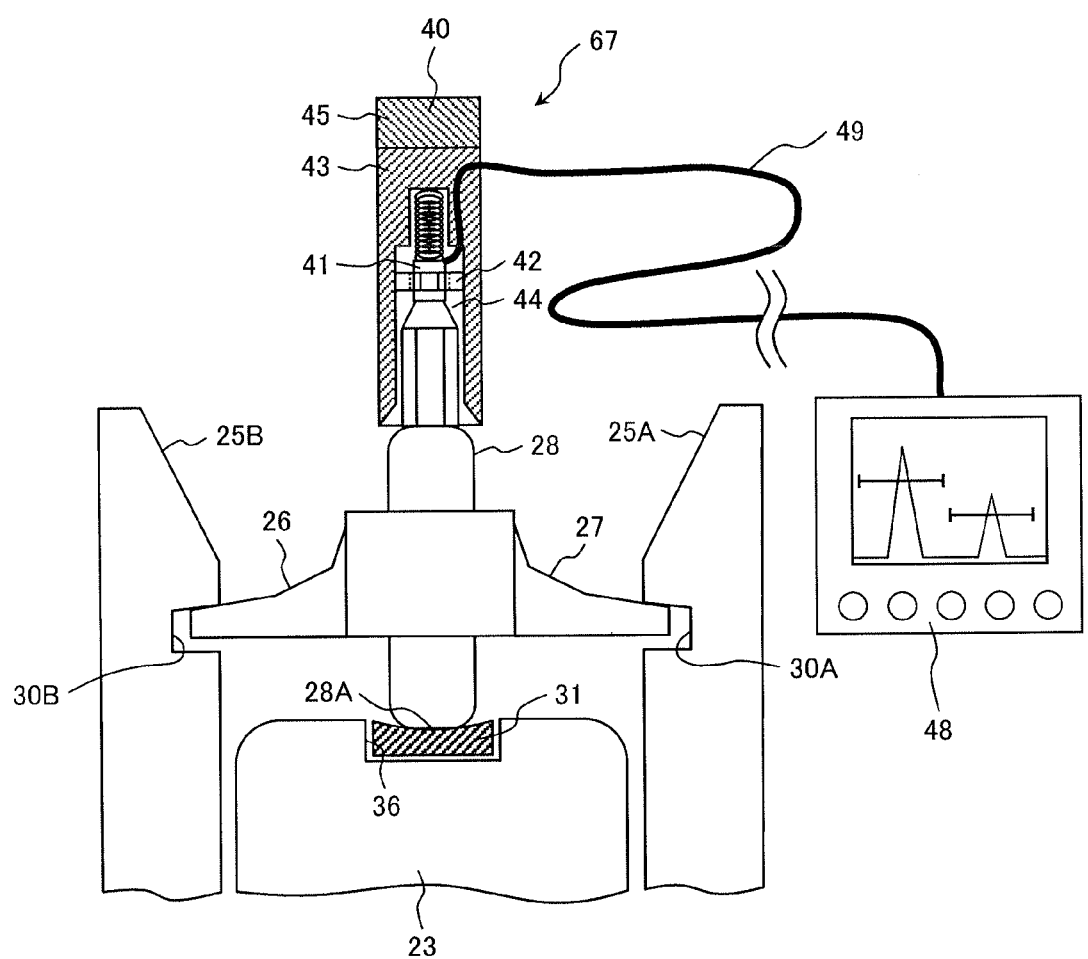
FIG. 1 is an explanatory drawing showing a method for checking an installed state of a jet pump beam according to embodiment 1, which is a preferred embodiment of the present invention.
Figure 2:
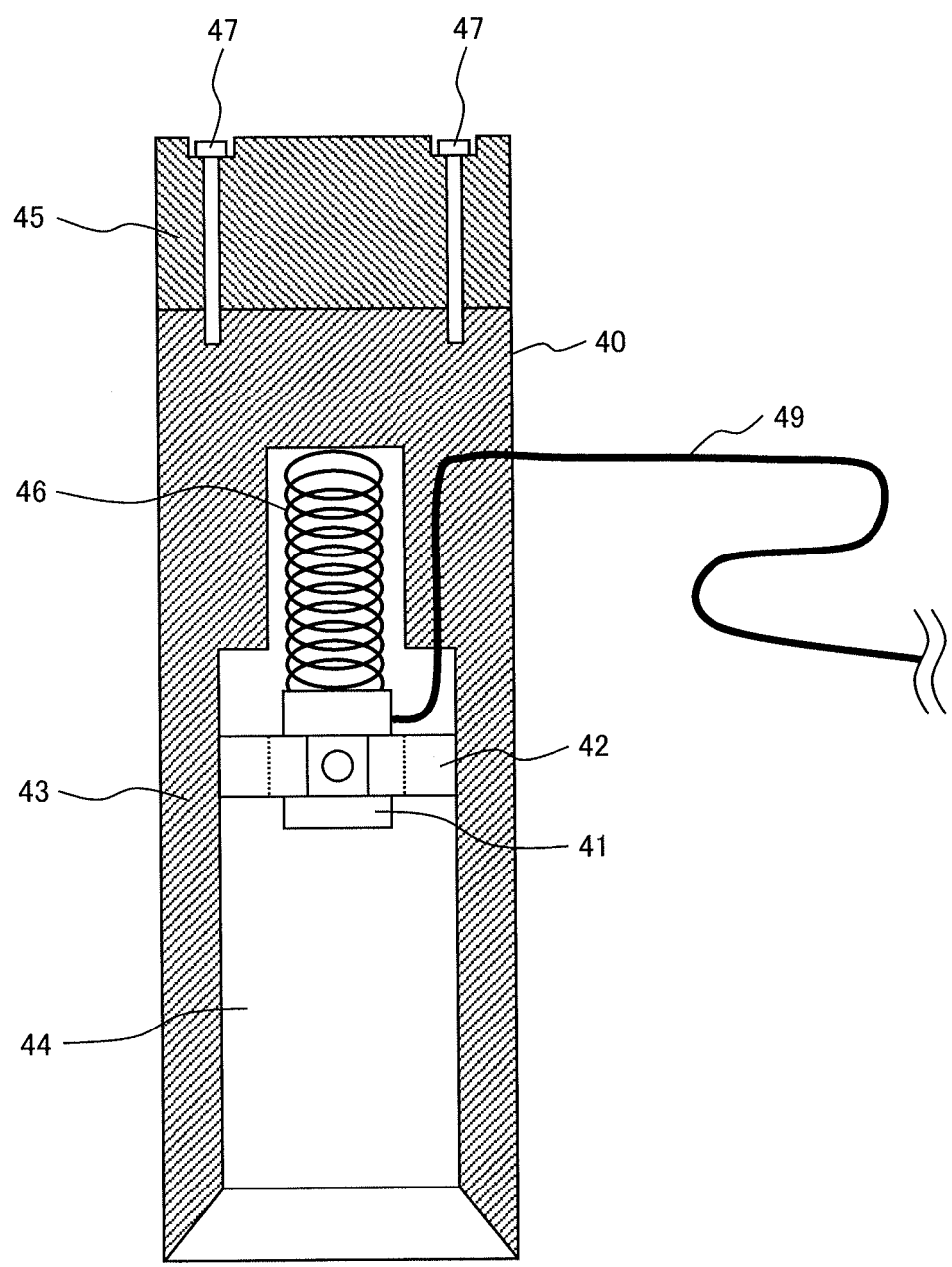
FIG. 2 is a longitudinal sectional view showing an ultrasonic sensor head shown in FIG. 1.

An installation checking apparatus 67 shown in FIGS. 1 and 2 is used in the method of checking an installed state of a jet pump beam according to the present embodiment. The installation checking apparatus 67 has an ultrasonic sensor head 40 and an ultrasonic measuring apparatus 48.

The ultrasonic sensor head 40 has an ultrasonic sensor 41, a fixing mechanism 42, a housing 43, a load adjusting weight 45, and a pushing spring 46. The housing 43 forms a hole 44 inside, and the hole 44 opens toward outside at one end of the housing 43. A sloping surface is formed to the housing 43 at the end of the hole 44. This sloping surface works as a guide when the head of the beam bolt 28 is inserted into the hole 44.

The ultrasonic sensor 41 is disposed in the hole 44 of the housing 43 and installed to the fixing mechanism 42 having a gimbal structure with at least two axes, disposed in the hole 44. The fixing mechanism 42 is movable in an axial direction of the hole 44, and part of the fixing mechanism 42 is inserted into at least one groove (not shown) formed in an inner surface of the hole 44. This groove extends in the axial direction of the hole 44. Since part of the fixing mechanism 42 is inserted in the groove, the fixing mechanism 42 is prevented from rotating in a circumferential direction of the hole 44. The pushing spring 46 is disposed between a bottom surface of the hole 44 and the ultrasonic sensor 41, contacting the bottom surface of the hole 44 and a surface of the ultrasonic sensor 41. The load adjusting weight 45 is installed to the other end of the housing 43 at which the hole 44 is not open, using a fixing screw 47.

The ultrasonic measuring apparatus 48 is connected to the ultrasonic sensor 41 with a coaxial cable 49.

Figure 7:
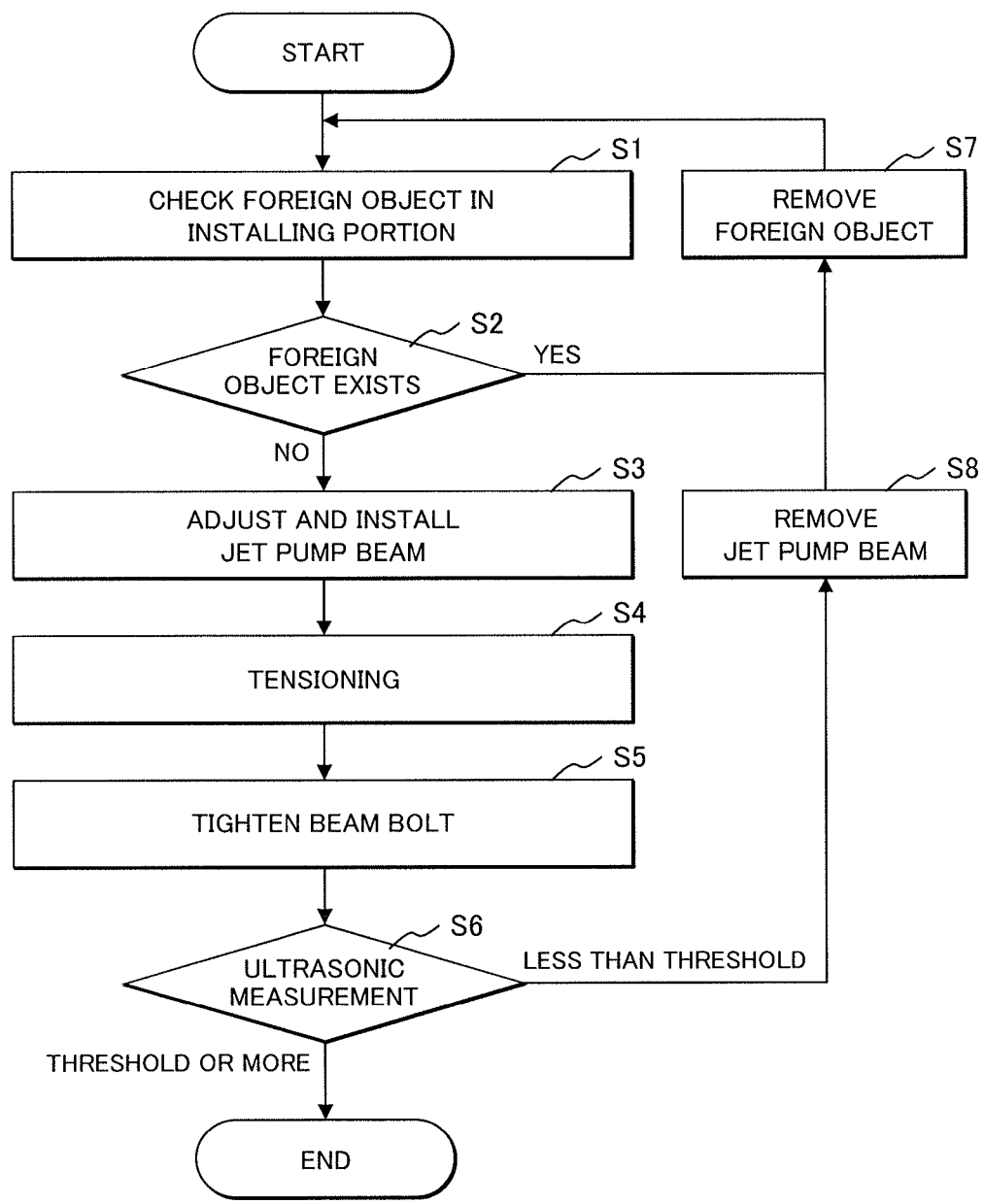
FIG. 7 is a flowchart showing operation processes in a method for checking an installed state of a jet pump beam shown in FIG. 1.
Figure 8:
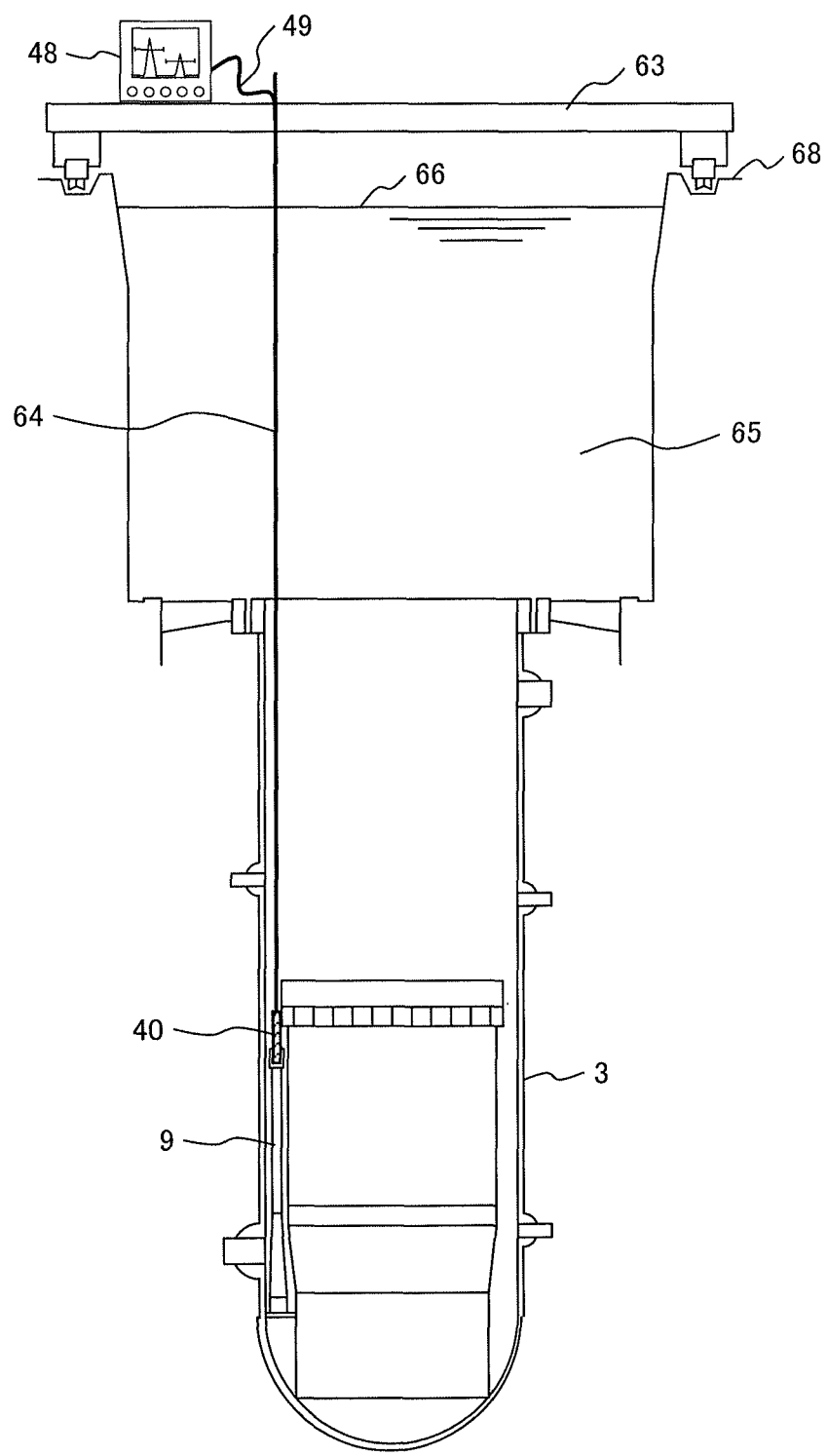
FIG. 8 is an explanatory drawing showing a process of ultrasonic measurement shown in FIG. 7.

The method of checking an installed state of a jet pump beam according to the present embodiment using the installation checking apparatus 67 is performed based on operation processes shown in FIG. 7.

During a periodic inspection of a boiling water reactor, the top head 3 of the RPV 1 is removed, and the steam dryer 16 and the steam separator 15 in the RPV 1 are removed and taken out of the RPV 1. All the fuel assemblies in the core 5 are taken out from the RPV 1 and transported to a fuel storage pool (now shown). By the time of transporting the fuel assemblies, cooling water 66 is filled in a reactor well 65 formed directly above the RPV 1 (see FIG. 8).

The beam bolt 28 is loosened and the jet pump beam 27 used until then is taken out from the grooves 30A and 30B of the pair of projecting portions 25A and 25B of the transition piece 22. Then, when a new jet pump beam 27 is installed to the pair of projecting portions 25A and 25B, the method of checking an installed state of a jet pump beam according to the present embodiment is performed.

Whether a foreign object exists in an installing portion or not is checked (step S1). A worker inspects the grooves 30A and 30B of the projecting portions 25A and 25B where the new jet pump beam 27 is to be installed, and the top surface of the insert member 31 fitted into the recess 36 formed in the too portion of the elbow 23 where an end 28A of the beam bolt 28 provided to the jet pump beam 27 comes in contact with. In addition, the worker also inspects the surface of the jet pump beam 27 to be installed. Whether a foreign object exists there or not is determined (step S2). When it is determined that the foreign object exists (YES), the foreign object is removed from the concerned region (step S7). After the foreign object is removed, the inspection in the step S1 is performed again.

When it is determined that no foreign object exists (NO) in the step S2, the jet pump beam is adjusted and installed (step S3). As shown in FIGS. 5 and 6, the jet pump beam 27 installed with the beam bolt 28 is installed to the opposing pair of projecting portions 25A and 25B. One end portion of the jet pump beam 27 is fitted into the groove 30A of the projecting portion 25A and another end portion of the jet pump beam 27 is fitted into the groove 30B of the projecting portion 25B facing the projecting portion 25A. Then, the jet pump beam 27 is moved horizontally along the grooves 30A and 30B and the both end portions of the jet pump beam 27 are positioned to the predetermined locations in the grooves 30A and 30B. Then, beam tensioning (beam arching) is performed (step S4). A tensioner (not shown) is attached to the center portion in the longitudinal direction of the jet pump beam 27, and the center portion of the jet pump beam 27 is pulled upward by the tensioner. This arches the jet pump beam 27.

Then, the beam bolt is tightened (step S5). While the jet pump beam 27 is being pulled up by the tensioner, the beam bolt 28 engaged with the screw hole formed through the jet pump beam 27 in the vertical direction is tightened. The bolt is tightened until the end 28A of the beam bolt 28 comes in contact with the top surface of the insert member 31 fitted into the recess 36. To be more specific, the end 28A of the beam bolt 28 comes in contact with the downward convex surface 71 formed in the top surface of the insert member 31. After the beam bolt 28 is completely tightened, the tensioner is removed from protrusions 27A and 27B. Even after the tensioner is removed, since the end 28A of the beam bolt 28 is in contact with the downward convex surface 71 formed in the top surface of the insert member 31, the shape of the jet pump beam 27 arched in the step S4 is maintained.

Ultrasonic measurement is performed (step S6). This ultrasonic measurement is performed to check an installed state of the jet pump beam 27. In order to perform the ultrasonic measurement, the ultrasonic sensor head 40 is attached to the head of the beam bolt 28 installed to the jet pump beam 27 pushing down the elbow 23 of the inlet mixer 24 of the jet pump 9 installed in the RPV 1.

Fixing of the ultrasonic sensor head 40 to the beam bolt 28 will be specifically described. A transfer apparatus (for example, a fuel exchanger) 63 is installed on an operation floor 68 in the reactor building (not shown) where the reactor containment vessel (not shown) for storing the RPV 1 is installed inside (see FIG. 8). The transfer apparatus 63 crosses over the reactor well 65 filled with cooling water 66. The ultrasonic measuring apparatus 48 is provided on the transfer apparatus 63. A worker on the transfer apparatus 63 holds a holding mechanism 64 attached to the ultrasonic sensor head 40 and lowers the ultrasonic sensor head 40 into the RPV 1 through the reactor well 65. Eventually, a lower end of the housing 43 of the ultrasonic sensor head 40 reaches the vicinity of the upper end of the beam bolt 28 installed to the jet pump beam 27. The ultrasonic sensor head 40 is lowered by the holding mechanism 64 while monitoring an image taken by a monitoring camera (not shown) disposed in the cooling water and displayed on a monitor. The hole 44 formed in the housing 43 is located directly above the beam bolt 28, and the ultrasonic sensor head 40 is further lowered. Consequently, the head of the beam bolt 28 is inserted into the hole 44 of the housing 43. When the ultrasonic sensor 41 comes in contact with the top end of the beam bolt 28, the ultrasonic sensor head 40 is stopped from being lowered (see FIG. 8).

Due to the function of the pushing spring 46 and the fixing mechanism 42 having a gimbal structure, the ultrasonic sensor 41 is closely pushed against the top end surface of the beam bolt 28. Furthermore, in order to maintain a constant pushing load of the ultrasonic sensor 41 onto the top end surface of the beam bolt 28 during the ultrasonic measurement by the ultrasonic sensor 41, the ultrasonic sensor 41 is pushed against the top end of the beam bolt 28 with a predetermined load generated by the housing 43 and the load adjusting weight 45. The pushing spring 46 also has a function of preventing the surface of the ultrasonic sensor 41 from being cracked by the shock of when the ultrasonic sensor 41 comes in contact with the top end surface of the beam bolt 28.

The pushing load of the ultrasonic sensor 41 onto the top end of the beam bolt 28 can be set to a given amount by changing the pushing spring 46 and the load adjusting weight 45 according to measuring environment of air or water. Since the load adjusting weight 45 is installed to the housing 43 using the fixing screw 47, the load adjusting weight 45 can be easily exchanged by removing the fixing screw 47.

In the present embodiment, the ultrasonic sensor 41 is used in water, thus the cooling water in the RPV 1 works as a couplant between the ultrasonic sensor 41 and the beam bolt 28. When the ultrasonic sensor head 40 is sunk in the cooling water 66 in the reactor well 65, air in the hole 44 of the housing 43 is exhausted outside the housing 43 through an air vent hole (now shown) formed in the upper end portion of the housing 43 to communicate with the hole 44, opening to the upper side of the housing 43. Consequently, the hole 44 is filled with cooling water 66.

When the cooling water 66 in the RPV 1 is discharged and the ultrasonic sensor head 40 is to be fixed to the beam bolt 28 in air, for example, couplant material (glycerin-based material, oil-based material, water, etc.) is applied to the end of the ultrasonic sensor 41 or the top of the beam bolt 28 in advance to allow ultrasonic waves sent from the ultrasonic sensor 41 to enter the beam bolt 28.

Figure 9:
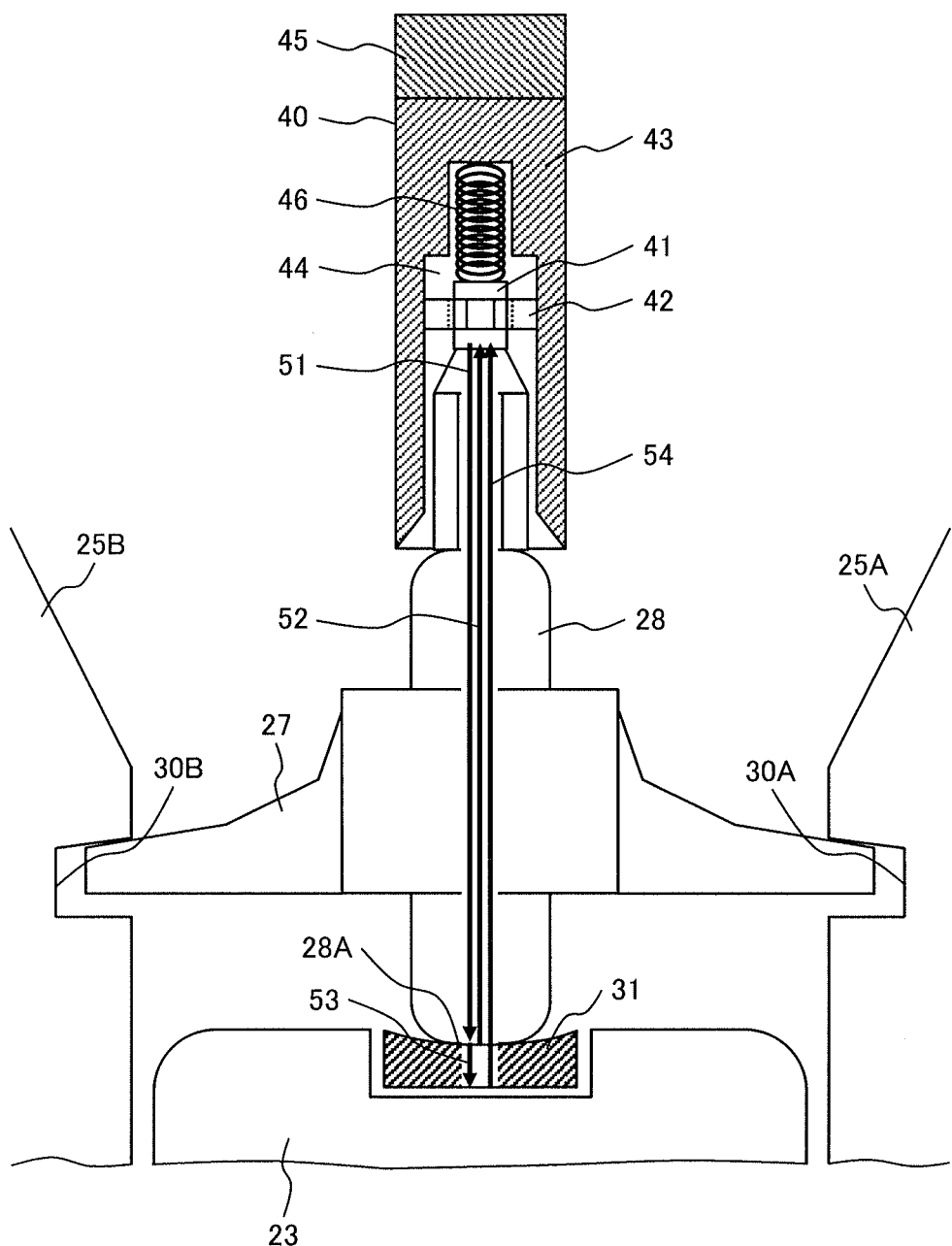
FIG. 9 is an explanatory drawing showing a propagation behavior of ultrasonic waves sent from an ultrasonic sensor of the ultrasonic sensor head fixed to a beam bolt provided to a jet pump beam.

Ultrasonic waves 51 sent from the ultrasonic sensor 41 contacting the top end of the beam bolt 28 enter the beam bolt 28 (see FIG. 9). The ultrasonic waves 51 propagate downward in the beam bolt 28 and reach the end 28A of the beam bolt 28. Part of the ultrasonic waves 51 reached the end 28A are reflected at the end portion 28A to become reflected waves 52, and the remaining ultrasonic waves 51 become transparent waves 53 and are transmitted to the insert member 31. These transparent waves 53 are reflected at a bottom surface of the insert member 31 to become reflected waves 54. The reflected waves 52 propagating through the beam bolt 28 upward are received by the ultrasonic sensor 41 as first echoes (first received waves), and the reflected waves 54 propagating upward through the insert member 31 and the beam bolt 28 are received by the ultrasonic sensor 41 as second echoes (second received waves). The ratio of the intensity of the transparent (ultrasonic) waves 53 transmitted to the insert member 31 to the intensity of the reflected waves 52 varies depending on the contact condition between the end 28A of the beam bolt 28 and the top surface of the insert member 31.

Now, a difference shown for the first echoes (the first received waves) and the second echoes (the second received waves) in difference contact conditions between the end 28A of the beam bolt 28 and the top surface of the insert member 31 will be specifically described with reference to FIGS. 10 and 11.

Figure 10:
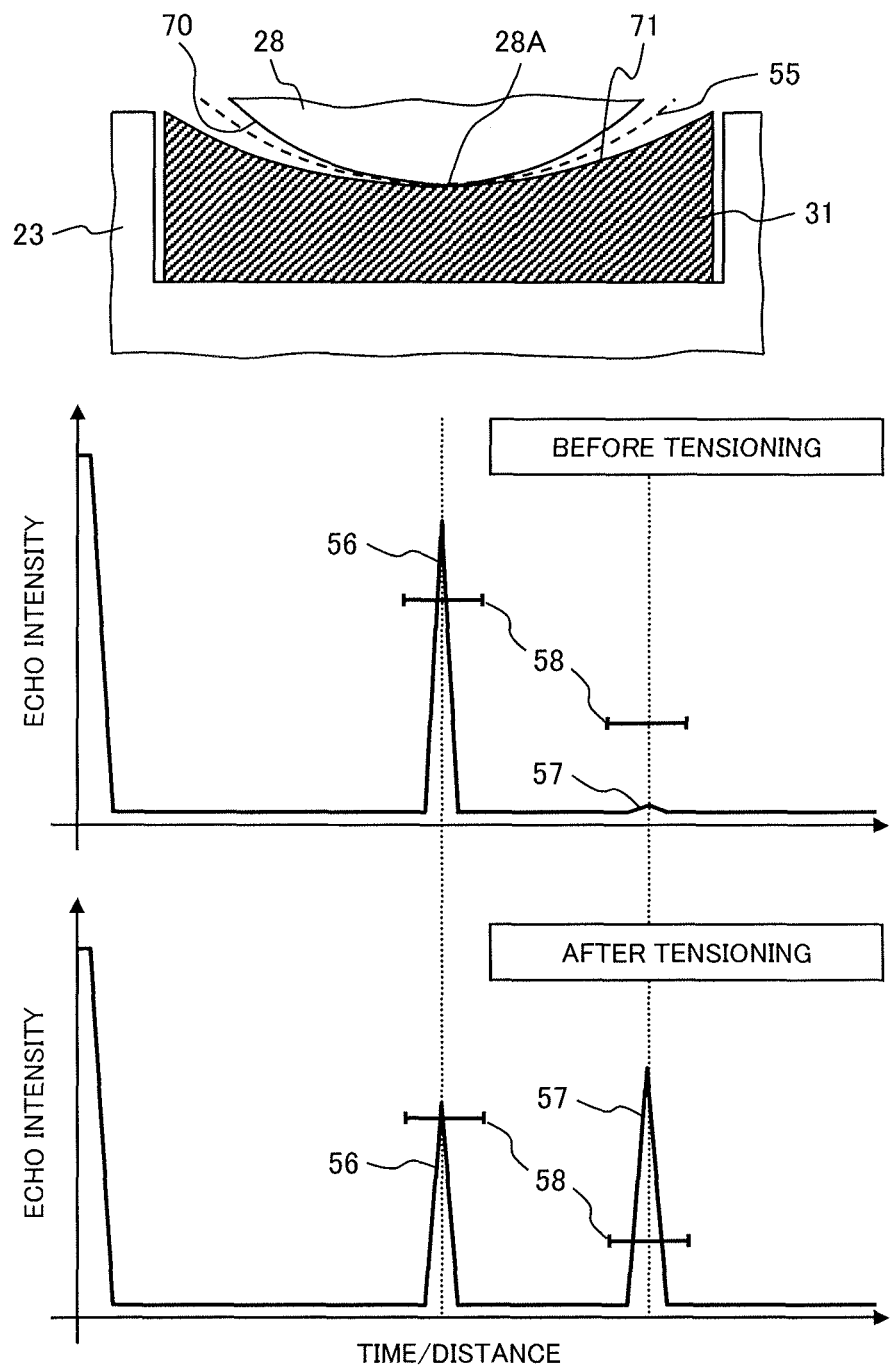
FIG. 10 is an explanatory drawing showing measurement results of ultrasonic echo intensity before and after tensioning of a jet pump beam when a beam bolt and an insert member are correctly in contact with each other.

FIG. 10 shows results of measuring first echo intensity 56 and second echo intensity 57 before and after the tensioning of the jet pump beam 27 when the end 28A of the beam bolt 28 and the top surface of the insert member 31 are correctly in contact with each other. As described above, the end 28A of the beam bolt 28 has a curved surface (to be more specific, a part of a spherical surface) 70 and is in contact with the downward convex surface (to be more specific, a part of a spherical surface) 71 formed in the top surface of the insert member 31, having a larger radius of curvature than that of the curved surface 70. When the end 28A of the beam bolt 28 is merely placed on the top surface of the insert member 31 before tensioning, the pushing force by the arched jet pump beam 27 is not yet on the top surface of the insert member 31 through the beam bolt 28, so that the end 28A of the beam bolt 28 is contacting the top surface of the insert member 31 only by the weight of the beam bolt 28. Thus, a contacting area between the end 28A of the beam bolt 28 and the top surface of the insert member 31 is small. As a result, the echo intensity 56 of the reflected waves 52 reflected at the end 28A of the beam bolt 28 is large, and the echo intensity 57 of the reflected waves 54 transmitted to the insert member 31 and reflected at the bottom surface of the insert member 31 is smaller than the echo intensity 56 (see "Before tensioning" in FIG. 10).

In a state where the jet pump beam 27 is arched after the tensioning in which a predetermined upward load has been added to the jet pump beam 27, the radius of curvature of the curved surface (the part of the spherical surface) 70 of the end 28A of the beam bolt 28 is increased as shown in a dashed line 55 due to the elastic deformation of the beam bolt 28 pushed against the top surface of the insert member 31 by the pushing force of the arch jet pump beam 27. The increase in the radius of curvature of the curved surface 70 of the end 28A of the beam bolt 28 increases the contacting area between the end 28A of the beam bolt 28 and the top surface of the insert member 31. Consequently, the ultrasonic waves transmitted to the insert member 31 as the transparent waves 53 are increased among the ultrasonic waves 51 reached the end 28A of the beam bolt 28. Because of this, the echo intensity 56 of the reflected waves 52 generated at the end 28A of the beam bolt 28 is reduced compared to that of before the tensioning, and the echo intensity 57 of the reflected waves 54 generated at the bottom surface of the insert member 31 by the transparent waves 53 transmitted to the insert member 31 is increased compared to that of before the tensioning.

Next, the echo intensity 57 of the reflected waves 54 will be described that is in effect when a foreign object exists between the end 28A of the beam bolt 28 and the top surface of the insert member 31. FIG. 11 shows results of measuring the first echo intensity 56 and the second echo intensity 57 before and after the tensioning of the jet pump beam 27 when a foreign object 59 exists between the end 28A of the beam bolt 28 and the insert member 31. Before the tensioning of the jet pump beam 27 when the foreign object 59 exists, only the weight of the beam bolt 28 adds to the top surface of the insert member 31 through the foreign object 59, thus the radius of curvature of the curved surface 70 of the end 28A of the beam bolt 28 is the same as that of the beam bolt 28 immediately after the manufacturing. In addition, since the foreign object 59 exists there, the end 28A of the beam bolt 28 is not directly in contact with the top surface of the insert member 31. For this reason, even when the foreign object 59 exists there, the echo intensity 56 of the reflected waves 52 and the echo intensity 57 of the reflected waves 54 generated by the ultrasonic waves 51 propagated downward through the beam bolt 28 before the tensioning will be practically the same as those of when the end 28A of the beam bolt 28 and the top surface of the insert member 31 are correctly in contact with each other (FIG. 10) before the tensioning (see "Before tensioning" in FIGS. 10 and 11). The echo intensity 56 of the reflected waves 52 is larger than the echo intensity 57 of the reflected waves 54.

Figure 11:
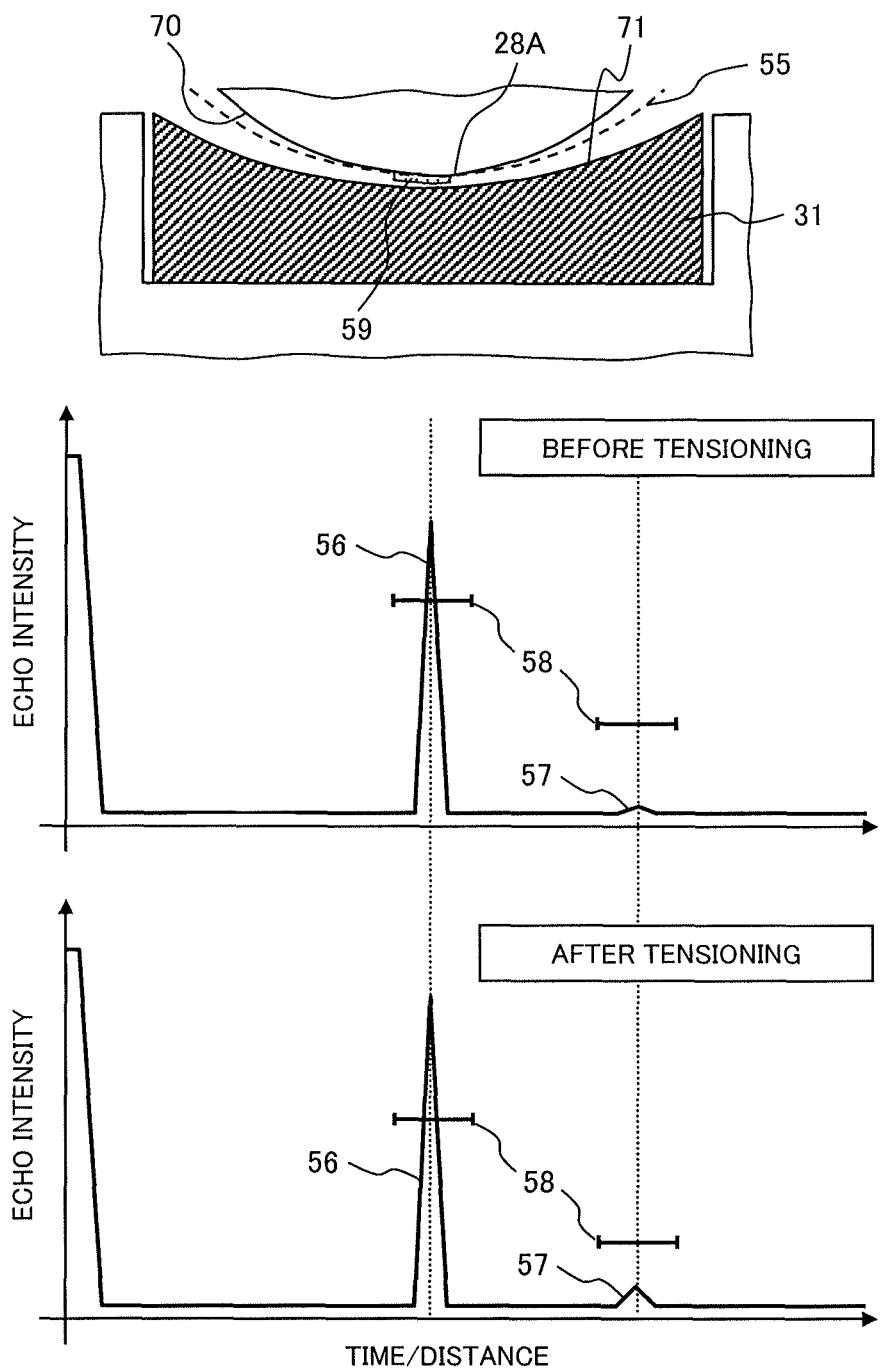
FIG. 11 is an explanatory drawing showing measurement results of ultrasonic echo intensity before and after tensioning of a jet pump beam when a foreign object is caught between a beam bolt and an insert member.

Even when the foreign object 59 exists there, the radius of curvature of the curved surface (the part of the spherical surface) 70 of the end 28A of the beam bolt 28 installed to the jet pump beam 27 is increased after the tensioning of the step S4 is performed, as shown in the dashed line 55 in a top drawing of the FIG. 11, by the elastic deformation of the beam bolt 28 pushed against the top surface of the insert member 31 by the pushing force of the arched jet pump beam 27. The foreign object 59 is also pushed against the top surface of the insert member 31 at this time. As a result, although the contacting area between the end 28A of the beam bolt 28 and the foreign object 59 is increased, since the beam bolt 28 is not directly in contact with the insert member 31, the contacting area between the end 28A of the beam bolt 28 and the top surface of the insert member 31, which affects the transmission of the transparent waves 53, is hardly increased. Therefore, when the foreign object 59 exists, the echo intensity 56 of the reflected waves 52 generated at the end 28A of the beam bolt 28 and the echo intensity 57 of the reflected waves 54 generated at the bottom surface of the insert member 31 show almost no change in before and after tensioning.

However, when the foreign object 59 is made of soft material such as resin, the end 28A of the beam bolt 28 closely comes in contact with the top surface of the insert member 31 through the plastic deformation of the foreign object, so the reflected waves 54 may increase in some degree. Even in this case, however, the echo intensity 57 of the reflected waves 54 will be smaller compared to the case when the end 28A of the beam bolt 28 is correctly in contact with the top surface of the insert member 31. Moreover, when the ultrasonic sensor 41 is put in contact with the top end of the beam bolt 28 using the fixing mechanism 42 having a gimbal structure, as shown in FIG. 9, in the ultrasonic sensor head 40 fixed to the top surface of the beam bolt 28, the energy of the ultrasonic waves 51 entering the beam bolt 28 from the ultrasonic sensor 41 may be different depending on the contact condition between the ultrasonic sensor 41 and the top end of the beam bolt 28.

For this reason, it is necessary to compensate for influence of the contact condition between the ultrasonic sensor 41 and the top end of the beam bolt 28 by obtaining a ratio of the echo intensity 57 of the reflected waves 54 to the echo intensity 56 of the reflected waves 52. When the echo intensity 56 of the reflected waves 52 is $R_A$ and the echo intensity 57 of the reflected waves 54 is $R_B$, an echo intensity ratio R can be obtained by equation (1).

$$R = RB/RA \quad (1)$$

Figure 12:
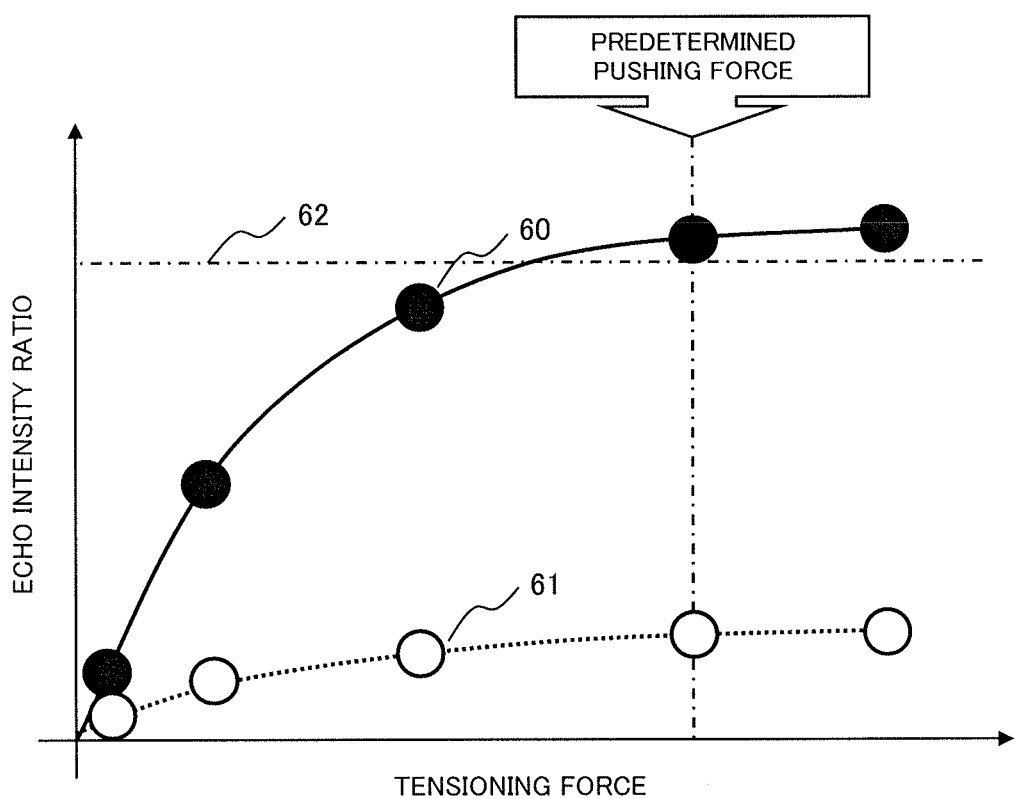
FIG. 12 is a characteristic drawing showing a relationship between tensioning force of a jet pump beam and an intensity ratio of echo intensity at a top surface of an insert member to echo intensity at an end of a beam bolt both in a normal case and in a case with a foreign object.

The echo intensity ratio R obtained by the equation (1) changes in response of the load (tensioning force) added to the jet pump beam 27 during tensioning, as shown in FIG. 12. In FIG. 12, a characteristic 60 shows a change in the echo intensity ratio R when the end 28A of the beam bolt 28 is correctly in contact with the downward convex curved surface 71 of the insert member 31. A characteristic 61 shows a change in the echo intensity ratio R of when the foreign object 59 exists between the end 28A of the beam bolt 28 and the top surface of the insert member 31. The echo intensity ratio R of when the end 28A of the beam bolt 28 is correctly in contact with the downward convex curved surface 71 of the insert member 31 shows a significant increase compared to the echo intensity ratio R of when the foreign object 59 exists between the end 28A of the beam bolt 28 and the downward convex curved surface 71 of the insert member 31.

The installed state of the jet pump beam 27 installed to the transition piece 22 can be checked by using these characteristics showing a relationship between the echo intensity ratio R and the tensioning force, shown in FIG. 12.

In the present embodiment, the characteristics showing the relationship between the echo intensity ratio R and the tensioning force (for example, the properties 60 and 61) calculated in advance by testing are stored in a memory (not shown) of the ultrasonic measuring apparatus 48. A threshold 62 (see FIG. 12) of the echo intensity ratio R also is stored in the memory of the ultrasonic measuring apparatus 48. The threshold 62 is set up in consideration of a safety rate based on the installed state and the load of the jet pump beam 27. In the ultrasonic measurement in the step S6, the ultrasonic waves 51 sent from the ultrasonic sensor 41 contacting the top end of the beam bolt 28 enter the beam bolt 28 after the ultrasonic sensor head 40 is fixed to the beam bolt 28.

The ultrasonic waves 51 entered the beam bolt 28 propagate downward in the beam bolt 28, and are reflected at each of the end 28A of the beam bolt 28 and the bottom surface of the insert member 31 as described above. The reflected waves 52 generated at the end 28A of the beam bolt 28 and the reflected waves 54 generated at the bottom surface of the insert member 31 are received by the ultrasonic sensor 41. The reflected waves 52 and 54 received by the ultrasonic sensor 41 are inputted to the ultrasonic measuring apparatus 48 through the coaxial cable 49.

The ultrasonic measuring apparatus 48 obtains the echo intensity 56 of the reflected waves 52 and the echo intensity 57 of the reflected waves 54 using the reflected waves 52 and 54 which have passed the time width of a time gate 58 (see FIGS. 10 and 11) set in advance. The ultrasonic measuring apparatus 48 substitutes the obtained echo intensities 56 and 57 into the equation (1) and calculates the echo intensity ratio R. In the ultrasonic measuring apparatus 48, the load (tensioning force) added to the jet pump beam 27 during the tensioning of the jet pump beam 27 in the step S4 already has inputted and stored. The ultrasonic measuring apparatus 48 determines whether the calculated echo intensity ratio R is at least the threshold 62 at the stored tensioning force. When the calculated echo intensity ratio R is the threshold 62 or more, the installed state of the jet pump beam 27 (pushing force by the beam bolt 28) is good, and the checking of the installed state of the jet pump beam 27 is completed.

When it is determined in the step S6 that the calculated echo intensity ratio R is less than the threshold 62 at the stored tensioning force, the jet pump beam is removed (Step S8). After the beam bolt 28 is loosened and the deflection of the jet pump beam 27 is released, the jet pump beam 27 fitted into the grooves 30A and 30B formed in the projecting portions 25A and 25B of the transition piece 22 is removed from the grooves 30A and 30B. Then, each operation process of the above-described the steps S1 to S6 (including the operation processes of the steps S7 and S8 if necessary) is repeated until the echo intensity ratio R becomes at least the threshold 62 and it is determined that the installed state of the jet pump beam 27 is good.

According to the present embodiment, the echo intensity 56 of the reflected waves 52 generated at the end 28A of the beam bolt 28 and the echo intensity 57 of the reflected waves 54 generated at the bottom surface of the insert member 31 by the ultrasonic waves 51 sent to the beam bolt 28 from the ultrasonic sensor 41 contacting the top end of the beam bolt 28 installed to the jet pump beam 27 are used to determine the installed state of the beam bolt 28 (pushing force by the beam bolt 28) attached to the jet pump beam 27 installed to the projecting portions 25A and 25B of the transition piece 22, so that it can be accurately checked whether the end 28A of the beam bolt 28 and the top surface of the insert member 31 are correctly in contact with each other or the foreign object 59 exists abnormally between them. In this way, the present embodiment can accurately check the installed state of the jet pump beam 27.

In particular, in the present embodiment, since the echo intensity ratio R is calculated using the echo intensities 56 and 57 and the installed state of the jet pump beam 27 is checked based on the calculated echo intensity ratio R, the influence of the contact condition between the ultrasonic sensor 41 and the beam bolt 28 can be reduced, allowing more accurate checking of the installed state of the jet pump beam 27.

There is a case when the jet pump beam 27 is fixed to the projecting portions 25A and 25B at an angle while the both end portions of the jet pump beam 27 are inserted to the groove 30A of the projecting portion 25A and the groove 30B of the projecting portion 25B. In this case, a center axis of the beam bolt 28 does not match with a center of the radius of curvature of the downward convex surface formed in the top surface of the insert member 31 where the end 28A of the beam bolt 28 comes in contact with. Because of this, the ultrasonic waves entering the insert member 31 among the ultrasonic waves entering the beam bolt 28 from the ultrasonic sensor 41 and propagating through the beam bolt 28 in the axial direction are reduced. Since the echo intensity 57 of the reflected waves 54 becomes smaller than the echo intensity 56 of the reflected waves 52, it is determined in the step S6 that the echo intensity ratio R is smaller than the threshold 62. In this way, even when the jet pump beam 27 is not properly fixed to the projecting portions 25A and 25B (when the jet pump beam 27 is installed at an angle), the installed state of the jet pump beam 27 can be more accurately checked by using the echo intensity ratio R. In such case, by removing the jet pump beam 27 from the projecting portions 25A and 25B in the step S8 and adjusting and installing the jet pump beam 27 to the projecting portions 25A and 25B in the step S3, the jet pump beam 27 can be properly installed to the projecting portions 25A and 25B in a correct manner.

In the present embodiment, the ultrasonic sensor 41 is installed in the hole 44 having an open end, formed in the housing 43, so that the ultrasonic sensor 41 can be easily put in contact with the top end of the beam bolt 28 by inserting the beam bolt 28 into the hole 44. This can shorten the time required for putting the ultrasonic sensor 41 in contact with the top end of the beam bolt 28. In addition, the ultrasonic sensor head 40 can be stably held by the beam bolt 28 because the beam bolt 28 is inserted in the hole 44 formed in the housing.

Furthermore, the time gate 58 is set up for each of the echo intensities 56 and 57 and the echo intensities 56 and 57 passing this time gate 58 are used to calculate the echo intensity ratio R, so that the influence of noise to the calculated echo intensity ratio R can be reduced. This can improve the accuracy of calculating the echo intensity ratio R.

Since the pushing spring 46 and the load adjusting weight 45 of the ultrasonic sensor head 40 are attached to the housing 43 in an exchangeable manner, the ultrasonic sensor 41 can be pushed against the beam bolt 28 with appropriate pushing force when the ultrasonic sensor head 40 is used in either air or water.

As shown in FIGS. 10 and 11, a conventional ultrasonic flaw detector obtains reflected echo intensity from the absolute value of a reflected waveform. However, the same operation is possible to achieve by combining, for example, a pulsar receiver and an oscilloscope. In this case, since an obtained signal has an RF waveform, the amplitude of a reflected wave can be obtained by subtracting a peak of a negative side of the reflected wave from a peak of a positive side of the reflected wave. This obtained amplitude of the reflected wave can be used in place of the echo intensity.

Embodiment 2

Figure 13:
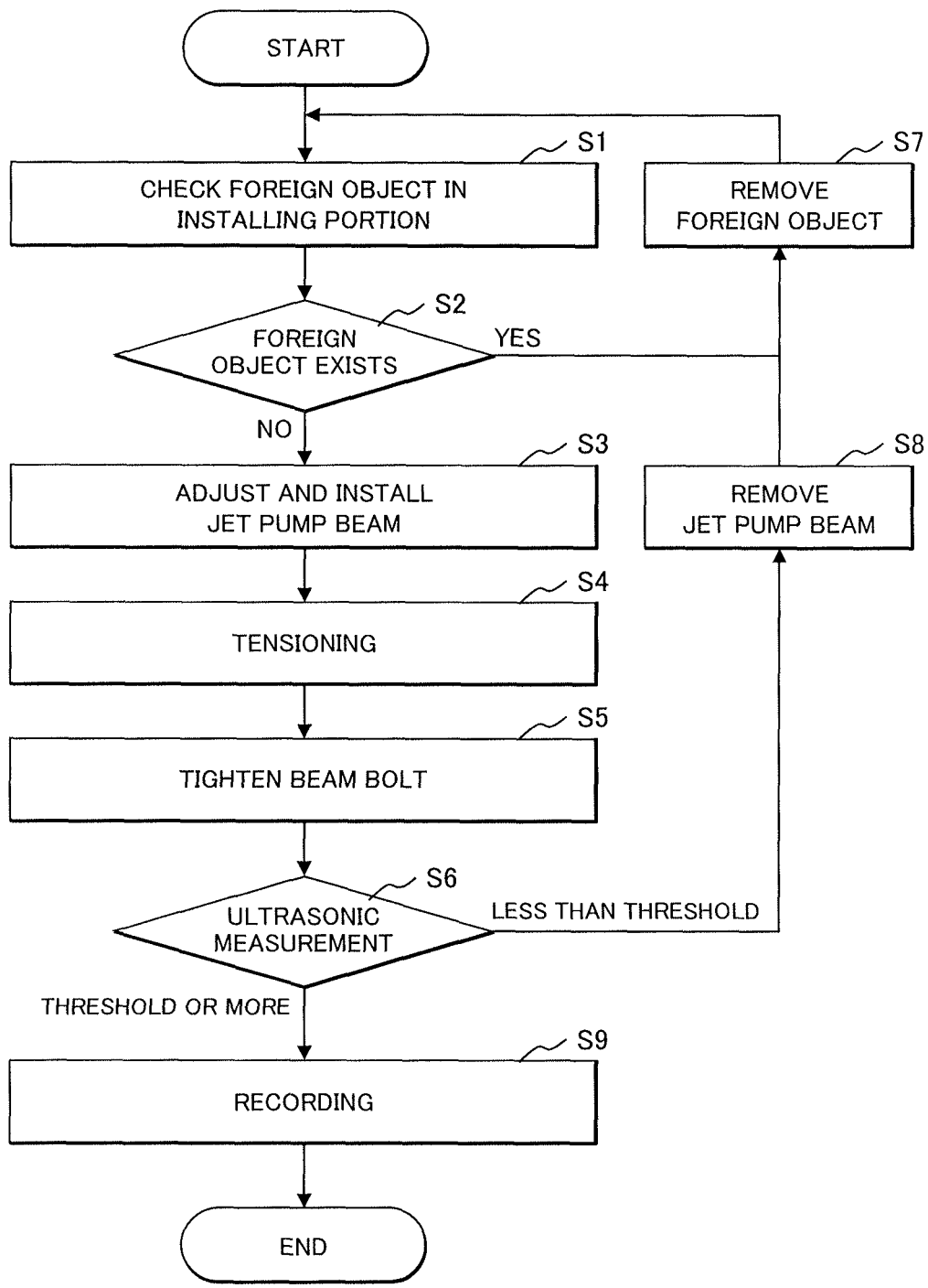
FIG. 13 is a flowchart showing operation processes in a method for checking an installed state of a jet pump beam according to embodiment 2, which is another embodiment of the present invention.

A method of checking an installed state of a jet pump beam according to embodiment 2, which is another embodiment of the present invention, will be described with reference to FIG. 13. An operation procedure to be performed in the present embodiment is an operation procedure in which a process of recording (step S9) is added to the operation procedure in the embodiment 1. The method of checking an installed state of a jet pump beam in the present embodiment also uses the installation checking apparatus 67 used in the embodiment 1.

In the present embodiment, each process of above-described the steps S1 to S6 is performed. If necessary, each process of the steps S7 and S8 is also performed. In the step S6, when it is determined that the calculated echo intensity ratio R is at least the threshold 62 at the stored tensioning force, obtained information is recorded (Step S9). In the step S9, information on the waveform of each of the reflected waves 52 and 54 received by the ultrasonic sensor 41, the echo intensities 56 and 57, the calculated echo intensity ratio R, and the determination result of the echo intensity ratio R is stored in a memory (not shown) of the ultrasonic measuring apparatus 48. Then, the method of checking an installed state of a jet pump beam in the present embodiment is completed.

The present embodiment can obtain each effect generated in the embodiment 1. In the present embodiment, since each piece of the above information is stored in the memory, when a record about checking of the installed state of the jet pump beam needs to be submitted, a report can be created based of the information stored in the memory of the ultrasonic measuring apparatus 48.

REFERENCE SIGNS LIST

1: reactor pressure vessel, 4: core shroud, 5: core, 9: jet pump, 10: nozzle, 12: throat, 13: diffuser, 21: riser pipe, 22: transition piece, 23: elbow, 24: inlet mixer, 25, 25A, 25B: projecting portion, 26: beam assembly, 27: jet pump beam, 28: beam bolt, 28A: end, 30A, 30B: groove, 31: insert member, 40: ultrasonic sensor head, 41: ultrasonic sensor, 42: fixing mechanism, 43: housing, 44: hole, 45: load adjusting weight, 48: ultrasonic measuring apparatus, 67: installation checking apparatus.

What is claimed is:

1. A method of checking an installed state of a jet pump beam, comprising:
    inserting end portions of a jet pump beam disposed above an inlet mixer
        into grooves formed in a pair of projecting portions of a transition piece provided to a riser pipe disposed in a reactor pressure vessel
        while a portion of the inlet mixer is disposed between the projecting portions,
        while one end portion of the inlet mixer is inserted to a diffuser provided in the reactor pressure vessel, and
        while another end portion of the inlet mixer is communicated with the riser pipe disposed in the reactor pressure vessel;
    arching the jet pump beam by moving a center portion of the jet pump beam upward;
    pushing a first curved surface
        formed at a lower end portion of a screw member engaged with the arched jet pump beam,
    against a second curved surface
        formed at a top surface of an insert member fitting into the portion of the inlet mixer,
    by tightening and elastically deforming the screw member, the second curved surface having a second radius of curvature larger than a first radius of curvature of the first curved surface;
    sending ultrasonic waves to the screw member from an ultrasonic sensor in contact with an upper end of the screw member,
toward a lower end of the screw member,
while the first curved surface of the screw member is pushed against the second curved surface of the insert member;
obtaining both
a first echo intensity of first reflected ultrasonic waves reflected at the first curved surface, and
a second echo intensity of second reflected ultrasonic waves reflected at a bottom surface of the insert member opposite from the second curved surface; and
checking installation of the jet pump beam using the first echo intensity and the second echo intensity,
based on a change in contacting area
between
the first curved surface of the screw member, and
the second curved surface of the insert member,
occurring upon tightening and elastically deforming the screw member.

2. The method of checking an installed state of a jet pump beam according to claim 1, wherein the checking installation of the jet pump beam is performed based on an echo intensity ratio obtained using the first echo intensity and the second echo intensity.

3. The method of checking an installed state of a jet pump beam according to claim 1, further comprising
putting an ultrasonic sensor head
provided with the ultrasonic sensor and a housing forming a hole having an open end for holding the ultrasonic sensor,
in contact with the screw member.

4. The method of checking an installed state of a jet pump beam according to claim 2, further comprising
putting an ultrasonic sensor head
provided with the ultrasonic sensor and a housing forming a hole having an open end for holding the ultrasonic sensor,
in contact with the screw member.

5. The method of checking an installed state of a jet pump beam according to claim 1, further comprising
providing contact between the ultrasonic sensor and the screw member
by covering the screw member with a housing of an ultrasonic sensor head
that includes the ultrasonic sensor disposed in a hole formed in the housing and opened toward outside at one end of the housing.

6. The method of checking an installed state of a jet pump beam according to claim 5, wherein a pushing load of the ultrasonic sensor against the upper end of the screw member is at least partially applied by a pushing spring disposed in the hole.

7. The method of checking an installed state of a jet beam according to claim 1, wherein a pushing load of the ultrasonic sensor against the upper end of the screw member is adjusted by a weight installed on a housing of an ultrasonic sensor head that includes the ultrasonic sensor.

* * * * *